Dec. 13, 1960

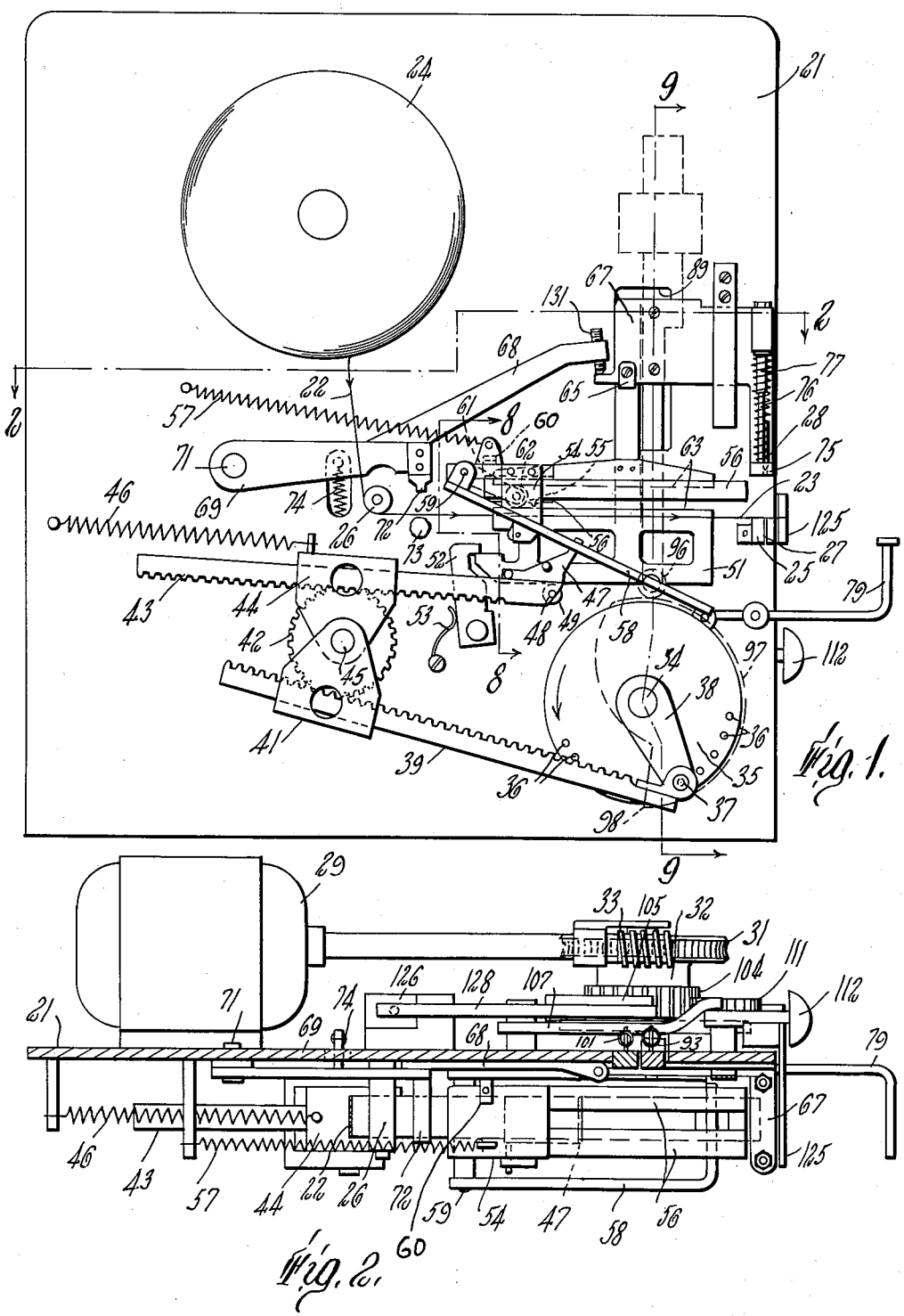

G. W. DE SMET ET AL 2,964,225

TAPE DISPENSING MACHINE

Filed March 24, 1958

Dec. 13, 1960  G. W. DE SMET ET AL  2,964,225
TAPE DISPENSING MACHINE
Filed March 24, 1958  5 Sheets-Sheet 3

Dec. 13, 1960  G. W. DE SMET ET AL  2,964,225
TAPE DISPENSING MACHINE
Filed March 24, 1958  5 Sheets-Sheet 4
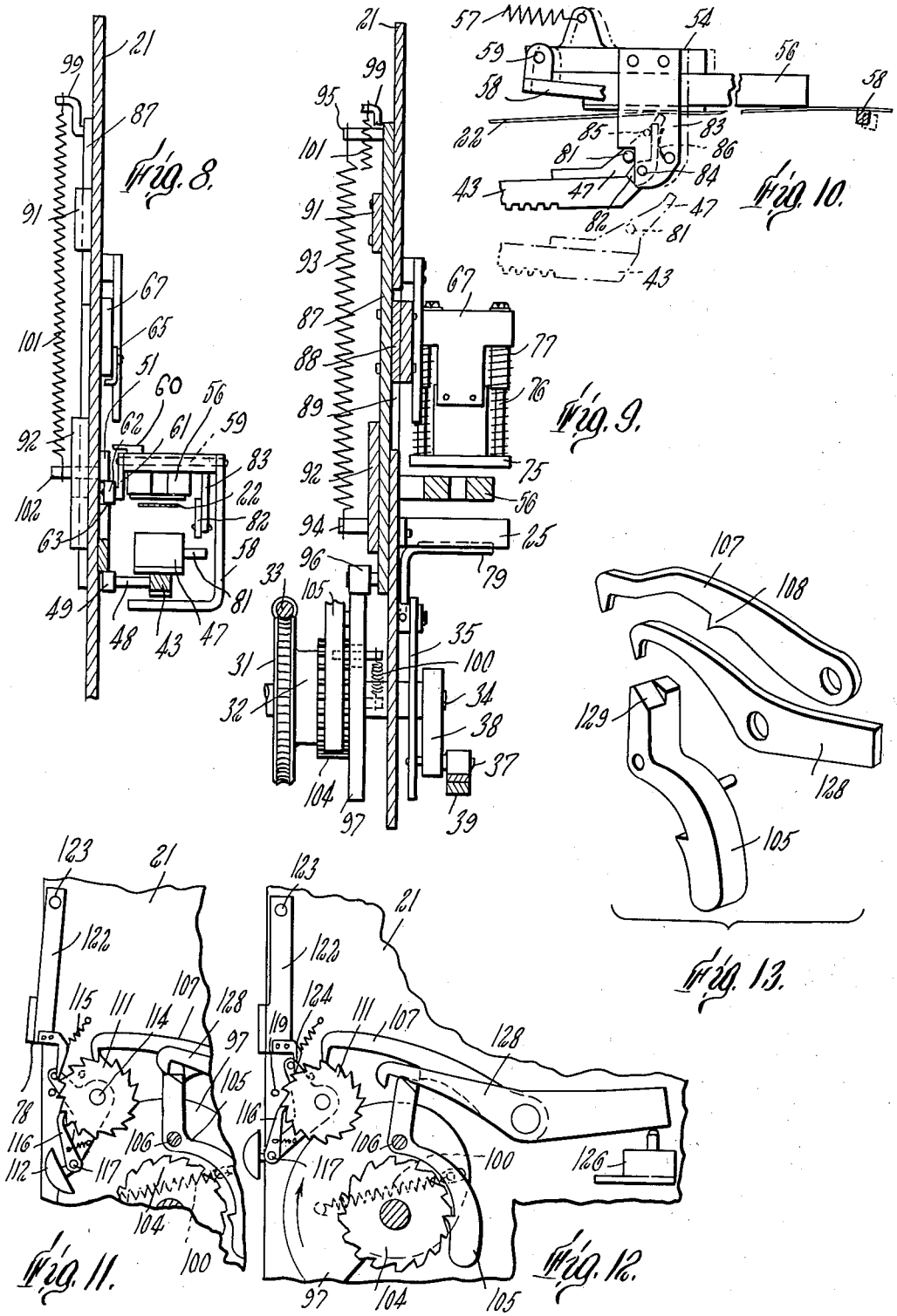

United States Patent Office 2,964,225
Patented Dec. 13, 1960

2,964,225

TAPE DISPENSING MACHINE

George W. de Smet, 3 Monadnock Road, Arlington, Mass., and Thomas W. Berridge, 102 Pleasant St., Stoughton, Mass.

Filed Mar. 24, 1958, Ser. No. 734,811

11 Claims. (Cl. 226—136)

(Filed under Rule 47(a) and 35 U.S.C. 116)

This invention relates to a machine for dispensing predetermined lengths of tape, especially pressure sensitive tape, or tape that has been made pressure sensitive.

In certain fields, notable among which is the packaging field, it is often required to make use of predetermined lengths of tape in great quantity. In this kind of operation it is especially significant that the labor cost involved in handling the tape often far exceeds the material cost. Although various devices have been developed to expedite the handling of tape, such devices have been of a manually operable type which require that the tape be severed by the operator as a part of the act of withdrawing it. This has greatly limited the effectiveness of the devices with the result that the use of tape has not been as extensive as it might be otherwise.

According to the present invention, there is provided a fully automatic tape dispensing machine designed to cut off predetermined lengths of tape and present them in a position where they may be readily used. The cut-off lengths of tape can be dispensed at any desired rate up to 90 pieces per minute. Therefore, through the use of this machine, the labor involved in handling short lengths of tape can be materially decreased and by reason of the ability of the machine to adjust to practically any desired length within machine limits, considerable tape savings can be effected as well.

An object of the present invention, therefore, is to provide an improved machine for dispensing predetermined lengths of tape.

It is another object of the invention to provide a machine of the above-mentioned character wherein the individual lengths of tape are automatically cut off.

It is another object of the invention to provide a machine of the above-mentioned character wherein the length of the tape cut off is reproducible to a high degree of accuracy.

It is another object of the invention to provide a machine of the above-mentioned character which is adapted to accommodate tapes and the like of variable dimension and character.

It is another object of the invention to provide a machine of the above-mentioned character wherein the tape length to be dispensed may be selected at will.

It is still another object of the invention to provide a machine of the above-mentioned character wherein each tape feeding operation can be initiated automatically when a piece of tape is withdrawn from the machine.

The novel features of the invention together with further objects and advantages thereof will become more readily apparent from the following detailed description and accompanying drawings of a preferred embodiment of the invention. In the drawings:

Fig. 1 is a side view in elevation of the tape dispensing machine according to the invention;

Fig. 2 is a plan view of the machine;

Fig. 8 is a sectional view taken on line 8—8 of Fig. 1;

Fig. 9 is a sectional view taken on line 9—9 of Fig. 1;

Fig. 10 is a view in elevation of the over-travel mechanism;

Figs. 11 and 12 are views in elevation of the clutch mechanism in two different operating positions;

Fig. 13 is a view in perspective of certain parts of the clutch; and

Figure 3:
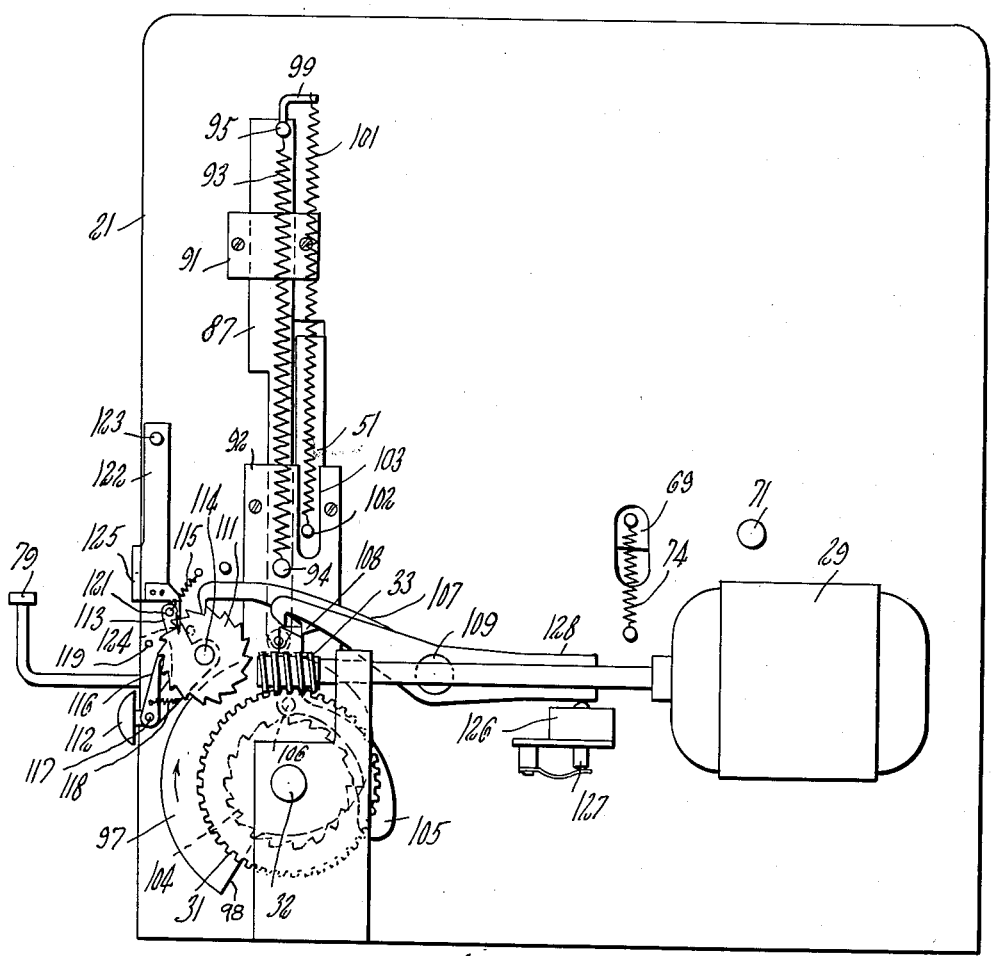
Fig. 3 is a view in elevation of the reverse side of the machine.

With reference now to the drawings and more particularly to Figs. 1 and 2, it will be observed that the various parts of the machine are supported by an upstanding plate 21, and that the feed movement of the tap 22 is primarily from left to right with respect to the plate. With the components of the machine in position to dispense a length of tape, as shown, the leading end 23 of a roll of tape 24 is supported by an anvil 25 and there is a guide roll 26 intermediate the tape roll and the anvil. The anvil is rigidly fastened to the plate and has a slot 27 to receive a knife 28 in the manner of a shear.

To feed the tap forwardly for a predetermined distance, that is toward the right, preparatory to its being cut off by the knife, there is provided a motor 29 which drives a gear wheel 31 on a shaft 32 through a worm 33 (Fig.2). Mounted rigidly on a shaft 34 coaxial with the gear wheel shaft is a crank in the form of a disk 35 provided with a series of holes 36. The holes are equally spaced from the center of the disk and in combination with a removable pin 37 serve to provide an angularly adjustable connection between the disk and an arm 38.

Pivotally connected to the arm 38 is a rack 39 constrained to move linearly by a fixed guide 41 while in mesh with a pinion 42. The pinion 42 drives another rack member 43 which is retained in a guide 44 adapted to pivot about an axis 45 while maintaining the rack 43 in mesh with the pinion. A spring 46 acts on the guide 44 tending to pivot it in a counterclockwise direction.

The right-hand end of the rack 43 rigidly supports a jaw 47 and a stub shaft 48 on which is mounted a roller 49. With the machine in the condition shown, the roller 49 is held down by a vertically movable control member 51 so that the jaw 47 is out of engagement with the tape. The control member 51 in turn is held down by a latch 52 which is adapted to be selectively released by the action of the rolled 49 and re-engaged under the influence of a leaf spring 53.

Cooperating with the jaw is a tape carriage 54 having a transverse ridge 55 formed in its undersurface and being mounted on a pair of guide members 56 for movement toward and away from the anvil 25 in a substantially horizontal plane. When the jaw is out of engagement with the carriage, as shown, the latter is maintained in a retracted position by a spring 57. To lift the tape off the anvil and engage the tape forwardly of the carriage, there is provided a finger 58 which is pivotally connected to the carriage and has rigidly attached thereto for pivotal movement about a common axis 59 an arm 61 carrying a roller 62. The roller is retained between horizontal guide surfaces 63 of the control member 51, and the arm 61 is adapted to come in contact with a stop 60 to limit the upward travel of the control member.

Figures 4, 5:
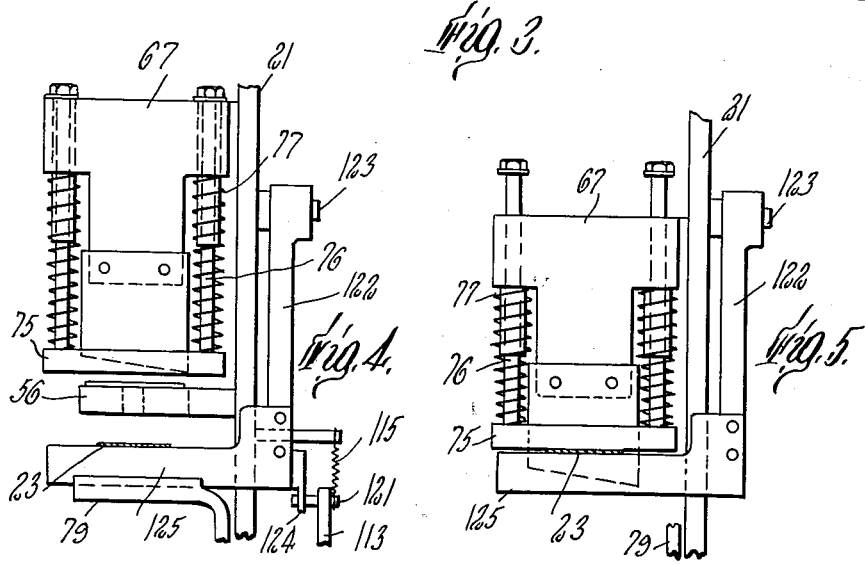
Figs. 4 and 5 are front views of the knife carriage in two different operative positions.

The knife 28 is supported in a knife carriage 67 which is provided with a contacting arm or bracket 65. During the latter part of the downward travel of the knife carriage 67, the bracket 65 is adapted to contact the control member 51, and to move it downwardly. During its upward movement, the knife carriage 67 is adapted to act on an arm 68 rigidly attached to a lever 69 pivoted at 71. Lever 69 carries a tape engaging bar 72 to clamp the tape against a fixed brake element 73. To this end, there is provided a spring 74 which acts counter to the knife carriage 67. There are a few other parts of the machine which bear mention at this point and one of these is the slotted hold-down bar 75 to clamp the tape against the anvil 25 slightly in advance of the knife. Bar 75 has a resilient connection to the knife carriage in the form of axially movable support rods 76 and compression springs 77 mounted on the support rods. This is shown in detail in Figs. 4 and 5. Extending forwardly of the anvil is a stationary support member 79 which optionally is adapted to be removed from the machine. The function of this support member is to support the leading end of the tape after it has been advanced and disengaged by the finger 58, as is sometimes necessary when relatively long lengths of tape are being dispensed or when the tape is of an especially flexible type.

In Fig. 10 there is shown, in somewhat greater detail than in Figs. 1 and 2, a mechanism which is adapted to produce a slight amount of over-travel of the finger 58 as it is released from the tape. This mechanism has been incorporated in the machine for use with the more flexible kinds of tape and especially those that tend to curl back on themselves at the end of a feeding operation. From Fig. 10 it will be seen that the mechanism comprises a wiper pin 81 rigidly mounted on the jaw 47 and a cam element 82 mounted for pivotal movement on an arm 83, the pivot axis of the cam element being designated by the numeral 84. The arm 83 is rigidly attached to the tape carriage 54 and extends downwardly therefrom substantially at right angles to the direction of tape travel. The cam element 82 is adapted to be contacted by the wiper 81 in the course of downward travel of the jaw and when so contacted it is restrained against pivotal movement in a counterclockwise direction by a stop pin 85. Stop 85 is rigidly mounted on the arm 83 together with a leaf spring 86 to bias the cam element towards the stop. Since the cam element is not free to move in a counterclockwise direction, the camming action produced by the pin 81 when the jaw moves downwardly will be translated into a momentary forward movement of the carriage and hence the finger 58. Conversely, when the jaw moves upwardly to engage the tape at the beginning of a feed operation, the cam element will be pivoted in a closckwise direction about its pivot axis 84 so that no forward movement of the carriage takes place.

The actuating mechanism for the knife carriage will now be described with reference to Fig. 3, which shows the reverse side of the plate 21, and also to Figs. 8 and 9. As best shown in Fig. 9, a vertically disposed bar 87 is rigidly attached to the carriage with a spacer member 88, the latter being disposed in the plane of the plate 21 where a suitable aperture 89 is provided. The bar 87 is mounted for vertical reciprocating movement in guides 91 and 92, and is biased in a downward direction by a spring 93. Spring 93 is at one end connected to a fixed pin 94 and at its other end to an abutment 95 projecting from the upper extremity of the bar. To raise the knife and maintain it in a raised position for an interval determined by the angular position of the shaft 34 there is a roller 96 mounted on the lower extremity of the bar 87 which cooperates with a cam 97 mounted to rotate with the shaft. An effective release action of the carriage is produced by the precipice 98 on the cam. At the upper extremity of the bar 87 there is another abutment 99 and a spring 101 is connected between this abutment and a pin 102. Pin 102 extends horizontally through an aperture 103 in the guide 92 and is rigidly attached to control member 51. The function of the psring is to bias the control member upwardly.

With reference now to Fig. 3, as supplemented by Figs. 11 and 12, it will be observed that the shaft 32 is adapted to be operatively connected to the shaft 34 by means of a one rotational clutch mechanism including a ratchet wheel 104 mounted on the shaft 32 for rotation with the gear wheel 31. Cooperating with the ratchet wheel 104 is a dog 105 pivotally connected to the cam 97 by means of a pin 106 and biased in a clockwise direction by a spring 100. The dog 105 is caused to engage and disengage the ratchet wheel by a level 107 having a depending latch portion 108. Lever 107 is at one end pivotally mounted on a fixed pin 109, and at its other end adapted to function as a pawl in cooperation with a second ratchet wheel 111. Ratchet wheel 111, in turn, is adapted to be stepped, that is moved angularly a tooth at a time, in response to the action of a control button 112.

To this end, there is provided a bell crank 113 pivotally mounted on the shaft 114 supporting the ratchet wheel 111, and urged in a clockwise direction by means of a spring 115. The button 112 is attached to the lower end of the bell crank and adjacent to it there is mounted a pawl 116 which pivots about an axis 117. A spring 118 serves to urge the pawl 116 into engagement with the ratchet wheel and a stop pin 119 functions to limit the movement of the bell crank in a counter-clockwise direction.

In addition to the button, the bell crank carries a pin 121 adapted to coact with a mechanism that may be locked in place when not in use, and unlocked for use in lieu of the button 112. This mechanism is seen to include a pivotal arm 122 extending generally downwardly from its pivot axis 123 and carrying a finger 124 for intermittent engagement with the pin 121. There is also affixed to the arm 122 a bar-like portion 125 which extends across the line of travel of the tape immediately adjacent and forwardly of the anvil 25. As will appear, the function of this mechanism is to initiate a new feeding operation automatically whenever a cut-off portion of the tape is withdrawn from the machine.

Either of the aforementioned manually initiated actions serves also to energize the motor 29. Specifically, the motor is connected to a suitable source of electrical energy through a switch 126, which has a vertically movable plunger 127. When the plunger is up, as it is normally, the switch is on, and vice versa. Acting on the plunger 127, is a rocker 128 pivoted at 109. The end of the rocker remote from the switch 126 is shaped in the form of a pawl which is acted upon by a bevelled portion 129 of the dog 105. The rocker 128 is shown in detail in Fig. 13 along with the dog 105 and the lever 107.

In describing the operation of the clutch mechanism, it will be assumed initially that the machine is at rest and it is desired to initiate a new feeding operation. Accordingly, one way is to depress the button 112 (Figs. 11 and 12) which causes the ratchet wheel 111 to advance one tooth. During this advance, the lever will be raised momentarily as it rides up on a tooth of the ratchet wheel 111, thereby unlatching the dog 105. As a result, the dog 105 is permitted to pivot under the influence of spring 100 into engagement with the ratchet wheel 104. As it does, the pawl end of the rocker arm 128 falls off the bevelled surface of the dog 105, permitting the plunger 127 to rise to its "on" position. This starts the motor, which will then be effective to drive the cam and the crank disk. After one full rotation of the ratchet wheel 104, the motor will be effectively declutched and at the same time de-energized. This comes about as follows. The dog 105 rotates with the ratchet wheel 104 until it reaches the latch 108 on the lever 107. At this point, the upper extremity of the dog is engaged by the latch 108 which will by then, have been returned to its operative position. That is to say, the lever 107 is raised only momentarily at the start of the cycle, and after it passes the edge of a tooth, it immediately falls back to the position shown in Fig. 11. Accordingly, at the end of the cycle the dog 105 will be pivoted in a counterclockwise direction out of engagement with the ratchet wheel thereby freeing the cam 97 and so also the disk-crank 35. Simultaneously, the rocker arm 128 will be pivoted in a clockwise direction as the bevelled surface 129 on the dog reengages the pawl end of the rocker, thereby causing the plunger 127 to move downwardly and switch "off" the motor.

It is apparent that the same general mode of operation prevails when the automatic actuating mechanism is employed, the only difference being that the bell crank 113 is rocked by the finger 125 instead of the button 112 at the start of a cycle. The manner in which the finger 125 is caused to move upon manual withdrawal of a length of tape will become more readily apparent from the following operational description of the parts shown in Figs. 14 through 18 as supplemented by Figs. 1, 6 and 7.

Figure 6:
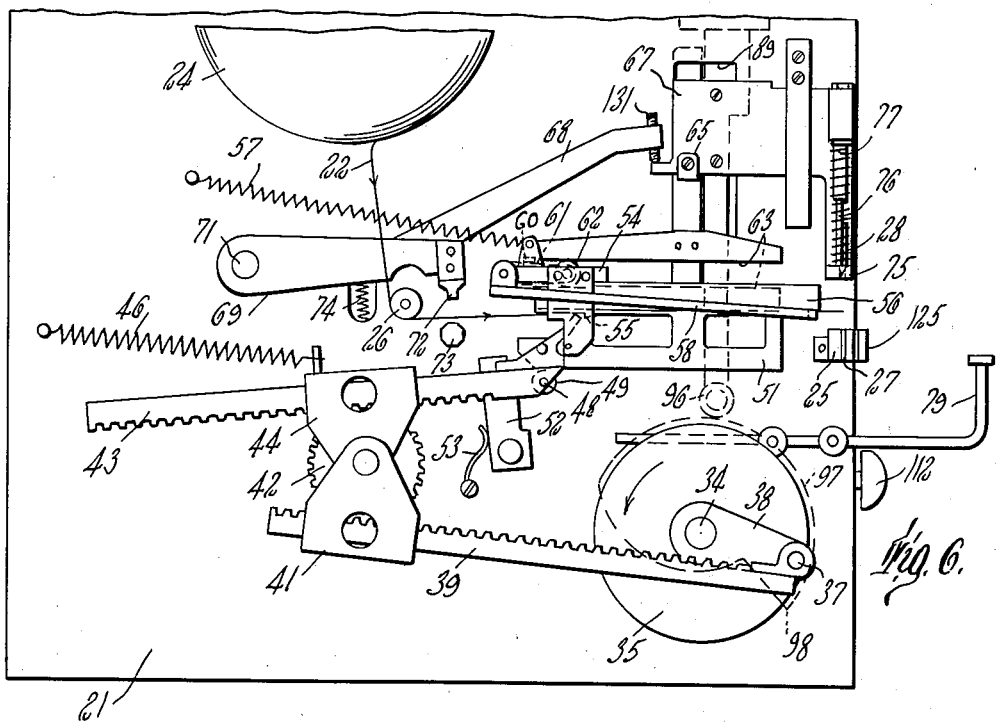
Figs. 6 and 7 are views like Fig. 1 except that the parts of the machine are in different operative positions.
Figure 14:
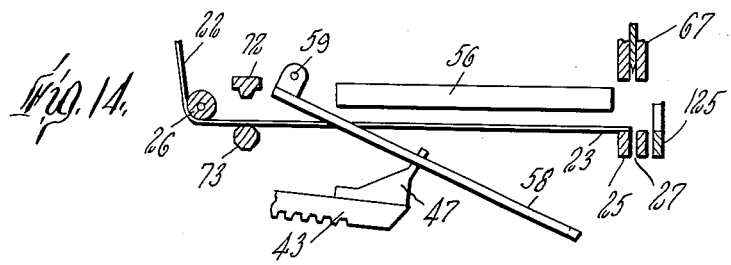
Figs. 14–18 are diagrammatic views of certain parts of the feed mechanism in different operating positions.
Figure 15:
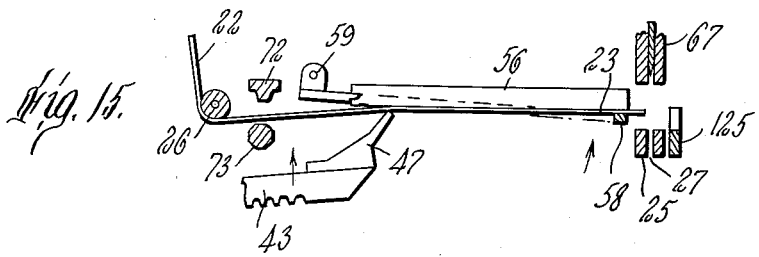
Figure 16:
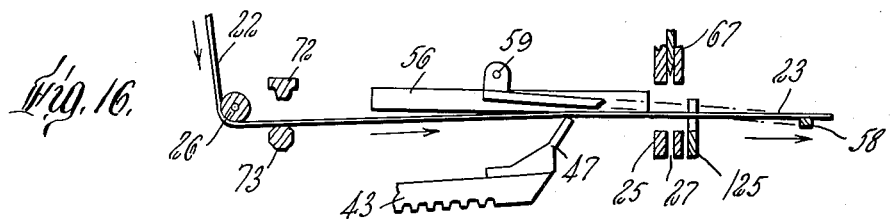
Figure 17:
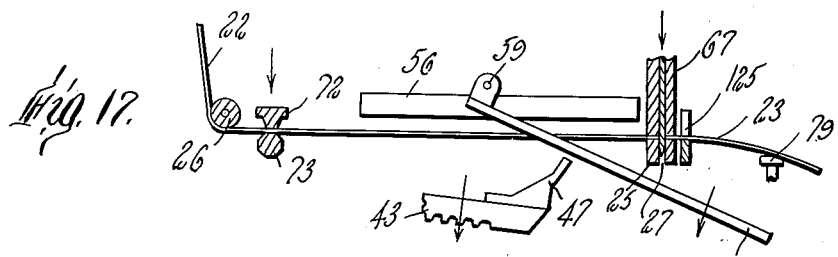

Specifically, Figs. 1 and 14 show the positions of the parts just prior to the initiation of a feeding operation. The knife carriage 67 is in its raised position, the tape carriage 54 is in its retracted position, towards the left, and the control member 51 is being maintained in its lower position by the latch 52. As a consequence of the position assumed by the control member, the finger 58 is out of engagement with the tape, as is the jaw 47. To begin a feeding operation, the motor is energized and operatively connected to the cam 97 with the result that shaft 34 is caused to begin its one rotational movement. Rotation of the shaft 34 is translated into linear movement of the rack 43 by the crank 35, the rack 39, and the pinion 42; and initially the rack 43 moves away from the anvil 25, or towards the left of Fig. 1. As the rack moves, so does the roller 49 which is maintained in rolling contact with the control member 51 under the influence of spring 46. When the roller comes in contact with the latch, the latter is pivoted out of engagement with the control member 51, which is then free to rise under the influence of spring 101 (Fig. 8). This permits the jaw 47 to pivot under the influence of spring 46 until the tape becomes clamped against the carriage by the jaw at a point just behind the ridge 55. At the same time the finger 58 is pivoted upwardly, lifting the tape off the anvil 25 and against the under surface of the guide members 56. The action of the lower guide surface 63 on the roller 62 produces the pivotal movement of the finger. Fig. 6 is a detailed showing of the machine at this stage of its operation, and Fig. 15 shows the same thing diagrammatically.

Further rotation of the shaft 34 produces movement of the rack 43 in the reverse direction, that is towards the right of Fig. 6, with the result that the tape carriage 54 is moved forwardly by the jaw 47 with the tape clamped in between. Since the finger 58 is pivotally mounted on the carriage 54, it too is caused to move forwardly beyond the anvil with the leading end of the tape adhered thereto. It is at this point that the knife carriage comes into play.

Figure 18:
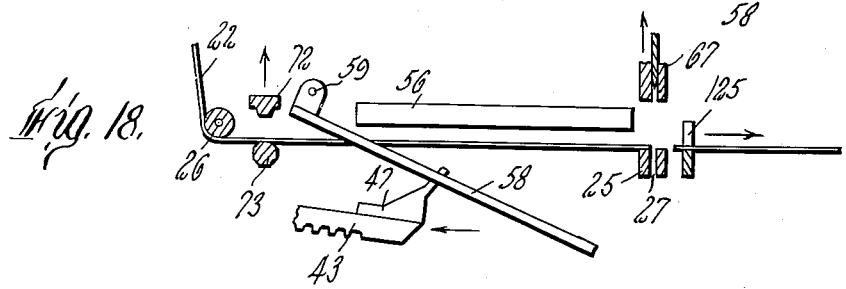

That is to say, after forward movement of the tape for a distance determined by the initial angular adjustment of the crank arm 38 with respect to the cam 97, the roller 96 associated with the knife carriage reaches the precipice 98 on the cam 97. When it does, the knife carriage is effectively released, and moves rapidly downwardly under the influence of its biasing spring 93 (Fig. 9). Downward movement of the knife carriage is transmitted to the control member 51 when the latter is contacted by the bracket 65, with the result that the control member is returned to its initial position and held there by the latch. During the return of the control member, the jaw 47 and the finger 58 are pivoted out of engagement with the tape permitting return movement of the tape carriage and the finger; and the hold-down bar 75 is brought downwardly with the knife carriage to clamp the tape against the anvil 25. The knife itself then comes down to sever the tape. When the abutment 95 comes in contact with the guide 91, downward movement of the knife is terminated. This is shown in detail in Fig. 7 and diagrammatically in Fig. 17. During the remainder of the one rotational shaft movement, the knife carriage is returned to its raised position by the cam, and the jaw is returned by the action of the crank. Fig. 18 shows the final positions of the parts after the motor has been declutched and deenergized.

Figure 7:
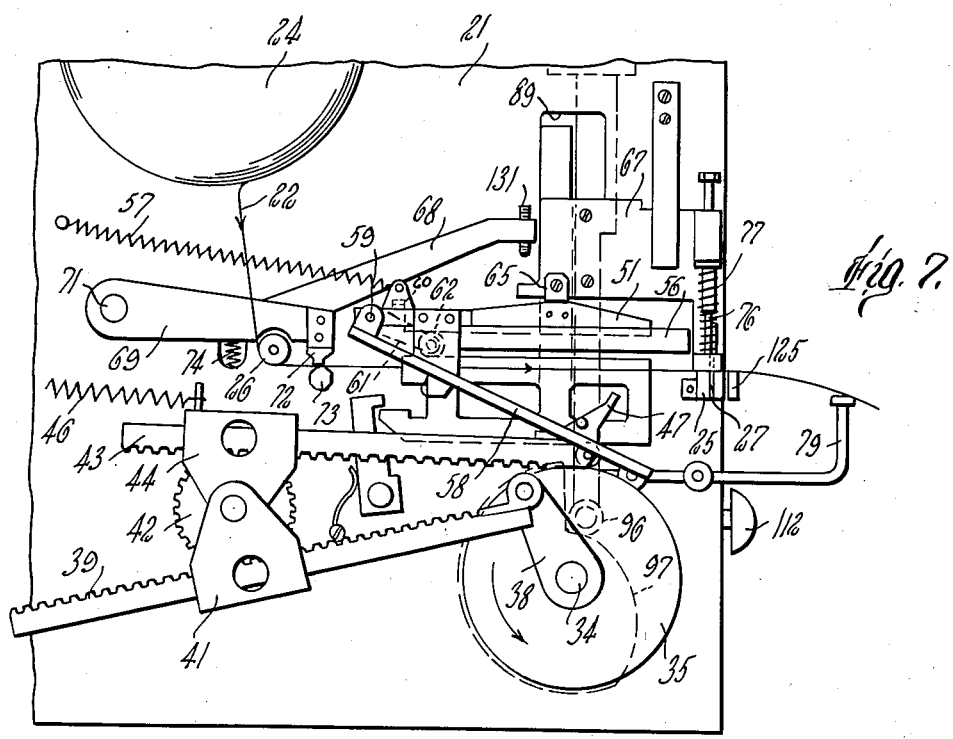

It will be apparent from Figs. 6 and 7 that when the knife carriage 67 moves downwardly, the arm 68 associated with the brake mechanism is permitted to fall under the influence of the spring 74 until the movable element 72 clamps the tape against the fixed element 73. Screw 131 on the arm 68 is adjusted so that this clamping action takes place just before the hold-down bar 75 and the knife 28 meet the anvil 25. Thus the tape is prevented from moving forwardly during the severing operation as it tends to do otherwise. When the knife carriage is raised by the action of the cam 97, the movable element 72 is moved away from the fixed element 73 thereby releasing the tape preparatory to the initiation of a new feeding operation.

As aforementioned, a new tape feeding operation can be initiated by depressing the button 112 or automatically in response to the forward movement of the cut-off portion of the tape when it is manually withdrawn. Automatic initiation of a new feed operation is produced as follows. With reference to the diagrammatic showing of Fig. 18, it will be observed that the hold-down bar 75 coacts with the anvil 25 at a point immediately adjacent to the tape engaging portion 125 of the arm 122 (Figs. 11 and 12). As a consequence, the underside of the tape becomes adhered to the tape engaging portion of the arm as well as to the anvil so that when the cut-off portion of the tape is withdrawn, the arm 122 is drawn forwardly (Fig. 18) or towards the left as shown in Figs. 11 and 12. From Figs. 11 and 12 it will be observed that when the bell crank 113 comes in contact with the stop 119, no further movement of the arm is permitted. It follows that the tape will be pulled off the arm permitting it to return to its initial position. When this happens, the ratchet wheel is stepped and through the action of the clutch mechanism, a new feeding operation is begun.

Although the machine according to the present invention has been especially designed for pressure sensitive tape or tape that has been made pressure sensitive prior to its being operated upon, the machine is not limited to use with its kind of tape. For example, it may be readily adapted for use with non-pressure sensitive tape by the provision of a suitable pressure sensitive surface or equivalent on the finger 58. Similarly, the tape engaging portion of the arm can be provided with like or other suitable tape engaging means. As thus modified, the machine could be used to dispense various kinds of strip material, one example being flattened plastic or paper tubing which is to me made into bags. Other modifications of this nature that are within the spirit and scope of the invention will no doubt occur to those skilled in the art and therefore the invention should not be deemed to be limited to the preferred embodiment illustrated and described herein by way of explanation, but rather it should be deemed to be limited only by the scope of the appended claims.

What is claimed is:

1. A machine for dispensing tape and the like comprising an anvil, a tape carriage mounted for reciprocating movement between a retracted position remote from said anvil and a forward position relatively close to said anvil, a jaw for clamping the tape to said carriage, a finger for engaging the tape forwardly of said carriage, a control member to produce synchronous movements of said jaw and said finger to engage and disengage the same from the tape when said carriage is in its retracted and forward positions, respectively, a driving mechanism connected to said jaw to move said carriage into its forward position and to cause said finger to move forwardly beyond said anvil once the tape has been engaged by said jaw and said finger, and means to return said carriage to its retracted position when said jaw and finger have been disengaged from the tape.

2. The combination as claimed in claim 1 including a motor to power said driving mechanism, a clutch mechanism to operatively connect said motor to said driving mechanism in response to a manually initiated action and to disconnect the same automatically in response to a predetermined movement of said driving mechanism, and a switch mechanism synchronized with said clutch mechanism to energize and de-energize said motor.

3. The combination as claimed in claim 1 wherein said driving mechanism includes a crank, a crank arm in the form of a rack member for adjustably driving connection to said crank, a pinion in mesh with said rack, and a second rack member in mesh with said pinion to rigidly support said jaw, said second rack member having pivotal movement while in mesh with said pinion whereby said jaw is moved into and out of engagement with the tape.

4. The combination as claimed in claim 1 including means disposed rearwardly of said anvil to maintain the position of the tape fixed while the same is being cut off.

5. A machine for dispensing tape and the like comprising an anvil, a tape carriage mounted for reciprocating movement between a retracted position remote from said anvil and a forward position relatively close to said anvil, a pivotally movable jaw for clamping the tape to said carriage, a finger pivotally mounted on said carriage for engaging the tape forwardly of said carriage, a control member to produce synchronous pivotal movements of said jaw and finger to engage and disengage the same from the tape when said carriage is in its retracted and forward positions, respectively, said member including a guide to maintain the angular position of said finger fixed when said carriage is in transit between its retracted and forward positions, a driving mechanism connected to said jaw to move said carirage into its forward position and thereby cause said finger to move forwardly beyond said anvil once the tape has been engaged by said jaw and said finger, and a spring to return said carriage to its retracted position when said jaw and said finger have been disengaged from the tape.

6. The combination as claimed in claim 5 including a follower element mounted on said carriage and a wiper element rigidly connected to said jaw to engage said follower element momentarily and to move it forwardly as the jaw is pivoted out of engagement with the tape, thereby to impart an initial forward component of motion to said finger as the latter becomes disengaged from the tape.

7. The combination as claimed in claim 5 including a fixed support member extending forwardly of said anvil to support the free end of the tape when said finger is disengaged therefrom.

8. The combination as claimed in claim 7 including a brake for intermittent clamping engagement of the tape, said brake having a fixed element and a movable element disposed in cooperative relation to said fixed element, and means to transmit motion to said movable element to move it into and out of clamping engagement with the tape.

9. The combination as claimed in claim 8 including at least one hold-down bar resiliently disposed in cooperative relation to said anvil for clamping engagement of the tape.

10. A machine for dispensing tape and the like comprising an anvil, a tape carriage mounted for reciprocating movement between a retracted position remote from said anvil and a forward position relatively close to said anvil, a pivotally movable jaw for clamping the tape to said carriage, a finger pivotally mounted on said carriage for engaging the tape forwardly of said carriage, a control member mounted for reciprocating movement and producing synchronous pivotal movements of said jaw and said finger, said member including a guide to maintain the angular position of said finger fixed when said carriage is in transit between its retracted and forward positions, means to produce movement of said control member in one direction to bring said jaw and said finger into engagement with the tape, and a driving mechanism connected to said jaw to move said carriage into its forward position and thereby cause said finger to move forwardly beyond said anvil once the tape has been engaged by said jaw and said finger.

11. A machine for dispensing tape and the like comprising an anvil, a tape carriage mounted for reciprocating movement between a retracted position remote from said anvil and a forward position relatively close to said anvil, a pivotally movable jaw for clamping the tape to said carriage, a finger pivotally mounted on said carriage for engaging the tape forward of said carriage, a control member mounted for reciprocating movement and producing synchronous pivotal movements of said jaw and said carriage toward and away from the tape, said member including a guide to maintain the angular position of said finger fixed when said carriage is in transit between its retracted and forward positions, spring biasing means to move said control member in one direction thereby to pivot said jaw and said finger into engagement with the tape when said carriage is in its retracted position, a driving mechanism connected to said jaw to move said carriage into its forward position causing said finger to move forwardly beyond said anvil once the tape has been engaged by said jaw and said finger, means to move said control member in the opposite direction and thereby pivot said jaw and said finger out of engagement with the tape when said carriage is in its forward position, a latch for engagement with said control member, a spring to return said carriage to its retracted position when said jaw and said finger have been disengaged from the tape, and means to release said latch in timed relation to the operation of said driving mechanism.

References Cited in the file of this patent
UNITED STATES PATENTS

| 1,960,945 | Krueger | May 29, 1934 |
| 2,405,790 | Krueger | Aug. 13, 1946 |
| 2,582,813 | Berridge | Jan. 15, 1952 |